(12) United States Patent
Dangy-Caye et al.

(10) Patent No.: US 9,325,859 B2
(45) Date of Patent: Apr. 26, 2016

(54) METHOD FOR OPTIMISING ELECTRICAL CONSUMPTION OF A RESIDENTIAL GATEWAY

(75) Inventors: Nicolas Dangy-Caye, Rueil-Malmaison (FR); Jean-Philippe Jaulin, Rueil-Malmaison (FR); Laurent Capdevielle-Fidel, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 40 days.

(21) Appl. No.: 14/241,715

(22) PCT Filed: Aug. 14, 2012

(86) PCT No.: PCT/EP2012/065892
§ 371 (c)(1),
(2), (4) Date: Apr. 25, 2014

(87) PCT Pub. No.: WO2013/029991
PCT Pub. Date: Mar. 7, 2013

(65) Prior Publication Data
US 2014/0355753 A1 Dec. 4, 2014

(30) Foreign Application Priority Data
Sep. 1, 2011 (FR) .................................. 11 57739

(51) Int. Cl.
*H04M 1/00* (2006.01)
*H04M 19/02* (2006.01)
*H04M 3/30* (2006.01)
*H04M 3/42* (2006.01)
*H04M 19/00* (2006.01)
*H04M 3/00* (2006.01)

(52) U.S. Cl.
CPC ................ *H04M 19/02* (2013.01); *H04M 3/30* (2013.01); *H04M 3/42314* (2013.01); *H04M 19/00* (2013.01); *H04M 19/005* (2013.01); *H04M 3/005* (2013.01)

(58) Field of Classification Search
CPC ........................... H04M 19/006; H04M 19/008
USPC ................................................ 379/88.01, 413
See application file for complete search history.

(56) References Cited

U.S. PATENT DOCUMENTS

| 5,909,445 A * | 6/1999 | Schneider ............. H04J 3/1623 370/468 |
| 5,940,408 A * | 8/1999 | Zitting .......................... 370/523 |

(Continued)

OTHER PUBLICATIONS

English translation of Written Opinion of the International Searching Authority for PCT/EP2012/065892, dated Mar. 22, 2014.

*Primary Examiner* — Van D Huynh
(74) *Attorney, Agent, or Firm* — Nixon & Vanderhye, PC

(57) ABSTRACT

A method for optimizing an electrical consumption of a residential gateway comprising at least one Foreign Exchange Station (FXS) port to which an analog telephone is connected via a line, the FXS port being configured from a pair of polarization points, referred to as default, which defines maximum voltage and current characteristics of the line, the method comprising storing at least one other pair of polarization points, referred to as economical, which defines maximum voltage and current characteristics of the line that are lower than those defined by the pair of default polarization points, selecting a pair of polarization points from the pair of default polarization points and the at least one pair of economical polarization points depending on the result of a comparative test on all these pairs of polarization points and configuring the FXS port from the pair of polarization points thus selected.

12 Claims, 6 Drawing Sheets

(56) References Cited

U.S. PATENT DOCUMENTS

| | | | |
|---|---|---|---|
| 7,792,282 B1* | 9/2010 | Huang et al. | 379/418 |
| 2010/0054426 A1* | 3/2010 | Skoglund | H04M 7/0069 379/33 |
| 2011/0081014 A1* | 4/2011 | Zhou | H04M 19/005 379/413 |
| 2011/0182286 A1* | 7/2011 | Zhang | H04M 11/062 370/352 |

* cited by examiner

METHOD FOR OPTIMISING ELECTRICAL CONSUMPTION OF A RESIDENTIAL GATEWAY

This application is the U.S. national phase of International Application No. PCT/EP2012/065892, filed 14 Aug. 2012, which designated the U.S. and claims priority to FR Application No. 11/57739, filed 1 Sep. 2011, the entire contents of each of which are hereby incorporated by reference.

The present invention concerns a method and device for optimising electrical consumption of a residential gateway.

Present residential gateways offer a user the possibility of receiving a call or calling someone via access to a VoIP (Voice Over Internet Protocol) service by connecting, via a cable, an analogue telephone either directly to this gateway or via a base by DECT. The telephone then establishing a wireless connection with this base.

To this end, as illustrated in FIG. 1, the residential gateway comprises, connected by a communication bus, a set of means, widely known in the prior art such as a processor, microprocessor, microcontroller (denoted μc) or CPU (Central Processing Unit) PROC, a Random Access Memory RAM, a Read Only Memory ROM, means (not shown) for interfacing with a communications network, such as for example a local area network, and/or a longer-distance network (Wide Area Network), in order to ensure continuity of this VoIP service then accessible from this network or these networks.

It also comprises one or even several FXS ("Foreign Exchange Station") ports for ensuring continuity of the digital telephone service between the gateway and the telephone or the base connected to this gateway via the cable forming a line (in the telephony sense of the term).

An FXS port ensures the generation of call signal, the support and transmission of the signals in the transmission and reception directions, as well as the processing of these signals, the recognition of the line signalling, i.e. the management of the signals that enable detecting the off-hooking of the telephone, the on-hooking thereof, the call-back signal of the recorder and recognition of the decimal dialling and of the multifrequency dialling.

In functional terms, an FXS port is conventionally divided into several sub-blocks that include, in particular, a line interface LIF that provides the analogue parameters of the line connecting the gateway to the telephone or to the base, an SLIC (Subscriber Line Interface Circuit) unit and a programmable direct current DC/DC converter controlled by the SLIC unit. The line interface LIF is connected in particular firstly to the line and secondly to the DC/DC converter and to the SLIC unit. The SLIC unit is also connected firstly to the DC/DC converter and secondly to the processor PROC. The gateway may also comprise two resistors R connected between the line and the SLIC unit. These resistors connect the Tip and the Ring of the FXS port to the analogue to digital convertor integrated in the SLIC unit and thus allows performing current or voltage measurements on the interface.

One of the functionalities of the arrangement consisting of SLIC unit, DC/DC converter and LIF interface is to ensure the supply, in terms of voltage and current, of the line. In this sense, this arrangement is similar to the SLIC units that traditionally equip telephone centres connecting a switched telephone network (PSTN).

Indeed, it is known that a line in a switched telephone network is continuously supplied so that the analogue telephone can operate both in off-hook mode, in order to offer an acceptable communication quality, and in on-hook mode, to enable the telephone to receive the signalling signals, i.e., for example, so that this telephone can detect a new incoming call and signal it by activating ringing of the telephone. For this purpose, in on-hook mode, special line voltage and current characteristics are applied to the line and, in off-hook mode, other line voltage and current characteristics apply to this line.

Indeed, an analogue telephone requires minimal line voltage and current to operate in on-hook mode and the values of this voltage and current are different from those required in off-hook mode. By way of example, FIG. 2 shows voltage/current curves that are normally used for characterising the electrical behaviour of telephones of the HPF, C110 and D35 type.

In order to ensure that all legacy telephones can correctly operate from their residential gateways, telephone operators configure each FXS port of their gateways according to a current/voltage curve hereinafter referred to as default curve, as illustrated in FIG. 3. These current/voltage characteristics are remarkable through a pair of default polarisation points P1 and P2 that define maximum line voltage and current characteristics to be applied to the line as soon as an analogue telephone is connected to an FXS port. As illustrated in FIG. 3, the point P1 defines the idle voltage, here around 46 V, when the telephone is on-hooked and the line current is zero. The point P2 defines the limitation current of the interface, here around 36 mA, applied when the polarisation voltage is less than or equal to a certain voltage, here around 33 V. The operating polarisation in off-hook mode results from the crossing point of the two current/voltage curves of the interface (FIG. 3) and telephone (FIG. 2). In practice, in off-hook mode, the limitation current is generally reached and the voltage depends on the telephone connected.

In practice, this pair of default polarisation points is stored in a non-volatile memory of the gateway such as for example the ROM memory. In operation, the FXS port is configured from this pair of default polarisation points, meaning the SLIC unit of this FXS port is programmed by the processor PROC reading line voltage or current characteristics in the ROM memory.

When the consumption on the interface is zero, i.e. in on-hook mode, the voltage of the point P1 is applied through the line interface LIF. When the consumption on this interface increases (off-hook mode), the DC/DC convertor adapts its voltage to follow the programmed polarisation curve and/or limits the line current to a limit value determined by the point P2.

Thus, according to the intrinsic characteristics of the telephone connected to the FXS port, variations in voltage and current, and therefore in electrical consumption of this FXS port, will therefore unavoidably occur from one telephone to another, and this for a given pair of default polarisation points. These variations will sometimes cause excessive electrical consumption for a given type of telephone since a lower line current could suffice for this type of telephone without degrading the quality of the telephony service rendered for this type of telephone.

The problem is therefore to optimise the power consumed by a telephone while enabling all the existing range of telephones to be able to operate correctly.

In this context of energy saving, one approach is to configure the FXS port from a pair of reduced polarisation points, by defining for example line current intensities and/or line voltage values that are much lower than those relating to the pair of polarisation points conventionally used.

However, this approach, which affords a significant gain during the communication phases, causes several problems.

First of all, an excessive reduction in the line current intensity and/or the maximum line voltage may imply malfunctioning of some telephones if this current is too low and/or the line voltage is insufficient with respect to the voltage/current curves of these telephones. This problem of insufficiency of line supply may occur both in off-hook mode but also in on-hook mode, which causes a serious malfunctioning of the telephone, which may even no longer detect, sometimes, a new incoming signal nor emit ringing. Reducing the line current intensity and/or the line voltage therefore does not ensure correct operation of the total range of legacy telephones.

Moreover, this pair of reduced polarisation points may be interpreted by some telephones as long-line conditions in the sense of conventional telephony. This type of telephone, for example the S63, then compensates for these particular connection conditions by modifying its internal transmission characteristics. This power compensation applied by the telephone modifies the nature of the telephone signal and distorts the perception of communication. The result therefrom is then a degradation in the global quality of communication, which may fall below the requirements of the operator. In addition, the electrical power supplied to the telephone may not be sufficient for this telephone to operate correctly.

The problem addressed by the present invention is to remedy the aforementioned drawbacks.

To this end, the present invention concerns a method for optimising the electrical consumption of a residential gateway comprising at least one FXS port to which an analogue telephone is connected via a line. Said FXS port being configured from a pair of polarisation points (PDD), referred to as default, which defines maximum voltage and current characteristics of the line that are predetermined so as to ensure correct operation of the telephone in on-hook or off-hook mode whatever the type of this telephone, the method is characterised in that it comprises the following steps:

storing at least one other pair of polarisation points, referred to as economical, which defines maximum voltage and current characteristics of the line that are lower than those defined by the pair of default polarisation points, selecting a pair of polarisation points from the pair of default polarisation points and said at least one pair of economical polarisation points depending on the result of a comparative test on all these pairs of polarisation points, and configuring the FXS port from the pair of polarisation points thus selected.

According to a first embodiment, a pair of polarisation points is selected thanks to the following steps:

configuring the FXS port from a pair of economical polarisation points, sending an incoming call signal to the telephone via the line, in the event of the telephone being off-hooked by a user before the expiry of a period of time,
sending a voice message to this telephone,
collecting the positive or negative feeling of the user at the end of the listening to this voice message, in case of the telephone not being off-hooked by a user at the end of the predetermined period of time, a negative feeling is attributed to this pair of polarisation points, reiterating these steps for each pair of economical polarisation points, in the event of a positive feeling by the user for a pair of economical polarisation points, this pair of economical polarisation points is selected, in the case where no feeling is positive, the pair of default polarisation points is selected.

According to a variant of this first embodiment, once the user has off-hooked the handset of his telephone following the sending of the ringing signal, this user is invited to speak at the end of a first voice message. A second voice message is sent by the telephone to the gateway, recorded during a given period of time and then re-sent to the telephone. The feeling attributed to a pair of polarisation points is then determined from the feeling of the user resulting from the listening to the two voice messages.

This variant is advantageous since it enables testing the quality of the bidirectional communications between the gateway and the telephone.

According to a variant, several pairs of polarisation points have to be processed, the pairs of polarisation points are then ordered so that they are processed from the most economical to the least economical and the pair of polarisation points is selected as soon as the user feeling is positive, the method then stopping as soon as the feeling of the user is positive.

This variant is advantageous since it enables rapid selection of the most economical pair of polarisation points that suits the user without for this purpose having to process all these pairs of polarisation points.

According to a second embodiment, selecting a pair of polarisation points is performed thanks to the following steps:
measuring an electrical characteristic of the line then charged by the telephone, and
if this measurement is above a threshold then the selected pair of polarisation points is the pair of default polarisation points, otherwise this pair is the pair of economical polarisation points.

According to one embodiment, the measured electrical characteristic of the line is the current-carrying capacity of the line.

According to one embodiment, selecting the pair of polarisation points takes account of the feeling of the user and the measurement of the electrical characteristic of the line.

According to one embodiment, selecting the pair of polarisation points is performed when the telephone is connected for the first time to the FXS port, and/or when the gateway is started up and/or by remote triggering and/or cyclically.

According to one embodiment, selecting the pair of polarisation points is performed either by the gateway or by a remote operator following the reception by this operator of the measurement of an electrical characteristic of the line and/or the feeling of the user.

This embodiment enables the remote configuration of the FXS port to be controlled by an operator from the feeling of the user or the measurement of an electrical characteristic of the line.

According to one embodiment, any one of the steps of the method may be pre-empted by the user.

According to one embodiment, the user can force the FXS port to be configured with a pair of economical polarisation points or with the pair of default polarisation points.

The present invention also concerns a computer program, characterised in that it comprises instructions for implementing, by a residential gateway, the method mentioned above, when said program is executed by a processor of the residential gateway.

The present invention also concerns storage means, characterised in that they store a computer program comprising instructions for implementing, by a residential gateway, the method mentioned above, when said program is executed by a processor of the residential gateway.

In addition, the present invention concerns a residential gateway comprising at least one FXS port adapted so that an analogue telephone be connected via a line, the gateway comprising:

means for configuring an FXS port from a pair of polarisation points, referred to as default, which defines maximum voltage and current characteristics of the line that are predetermined so as to ensure correct operation of the telephone in on-hook or off-hook mode whatever the type of this telephone. The residential gateway is characterised in that it also comprises means for obtaining at least one other pair of polarisation points, referred to as economical, which defines maximum voltage and current characteristics of the line that are lower than those defined by the pair of default polarisation points, means for selecting a pair of polarisation points from the pair of default polarisation points and said at least one pair of economical polarisation points according to the result of a comparative test on all these pairs of polarisation points, and means for configuring the FXS port from the pair of polarisation points thus selected.

The characteristics of the invention mentioned above, as well as others, will emerge more clearly from a reading of the following description of an example embodiment, said description being given in relation to the accompanying drawings, among which:

Figure 1:
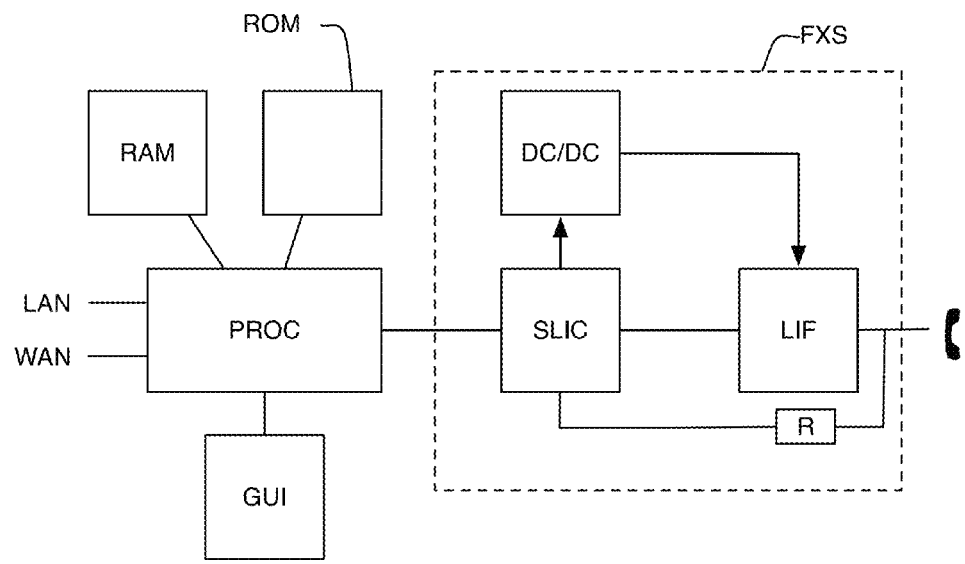
FIG. 1 shows a functional architecture of a residential gateway.
Figure 2:
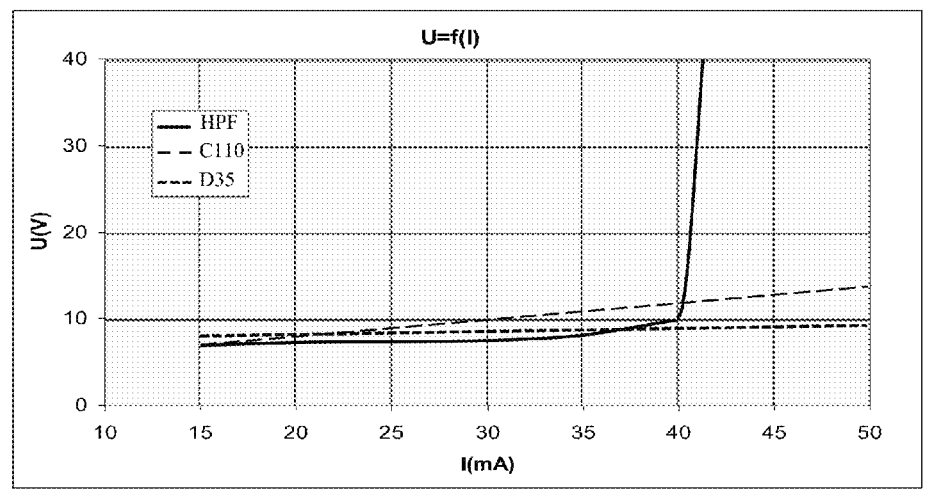
FIG. 2 shows voltage/current curves that characterise the electrical behaviour of analogue telephones.

It will be considered hereinafter that the residential gateway of FIG. 1 that comprises an FXS port provided so that an analogue telephone be connected via a cable that forms a line (in the telephony sense of the term) between this FXS port and this telephone. However, the gateway may also comprise more than one FXS port to each of which an analogue telephone may be connected, without departing from the scope of the present invention since, in this case, each FXS port is processed independently of the others by the method described in relation to FIGS. 5 to 8.

According to the present invention, the gateway comprises means for obtaining at least one other pair of polarisation points PPEi, referred to as economical, which defines maximum voltage and current characteristics of the line that are lower than those defined by the pair of default polarisation points, hereinafter referenced PPD.

These means are for example the non-volatile memory ROM of the gateway ROM or a memory on a remote item of equipment and the means of interfacing with the communication network so that that the gateway can access this equipment and obtain this (or these) polarisation pair(s).

Figure 3:
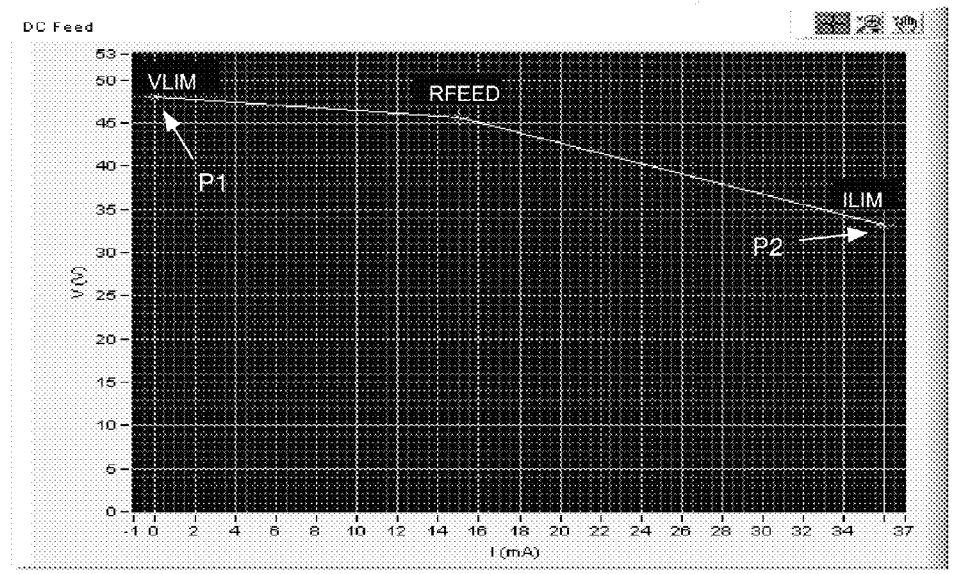
FIG. 3 shows a voltage/current curve that represents an electrical consumption profile of an FXS port.
Figure 4:
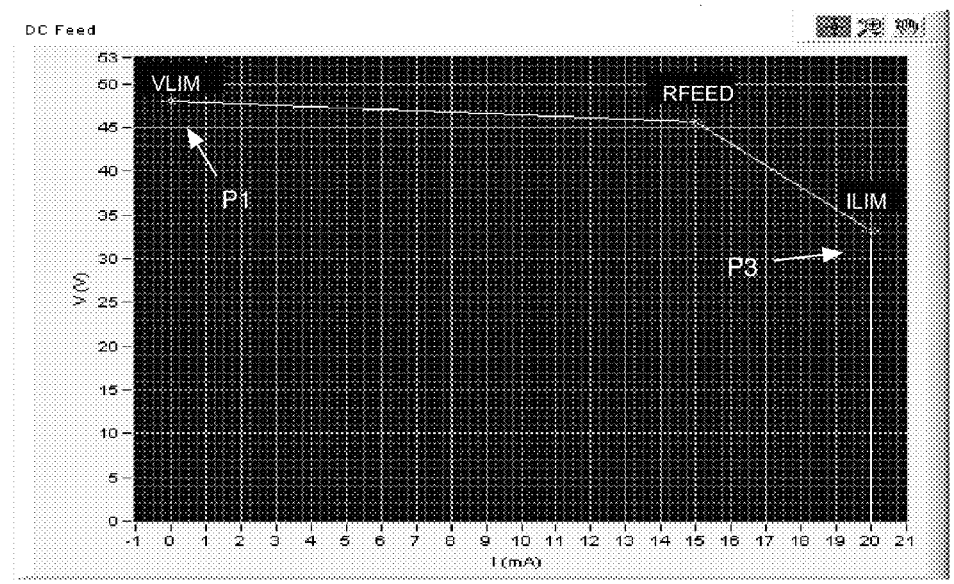
FIG. 4 shows a voltage/current curve that represents an economical electrical consumption profile of an FXS port.

FIG. 4 shows a voltage/current curve that represents an economical electrical consumption profile of an FXS port. On this curve, the pair of polarisation points P1 and P3 is for example used. The point P1 is the one previously described in FIG. 3. The point P3 corresponds to the case where the intensity of the current is maximum, here around 20 mA, and the maximum line voltage is 33 V. According to this example of a pair of economical polarisation points, only the intensity of the current that will be applied to the line when the telephone is in off-hook mode has been reduced with respect to the polarisation point P2 of the default polarisation pair PPD. This pair of polarisation points PPEi (P1 and P3) then enables reducing the power consumed by the telephone when in communication.

The gateway also comprises means for selecting a pair of polarisation points from the pair of polarisation points PPD and the pair or pairs of polarisation points PPEi according to the result of a comparative test on all these pairs of polarisation points.

According to one embodiment, the processor PROC is capable of executing instructions loaded in the RAM memory from the ROM memory, from an external memory (not shown in FIG. 1), from a storage medium, such as an SD card or the like, or from a communication network. When the gateway is powered up, the processor is capable of reading instructions from the RAM memory and executing them. These instructions form a computer program PROG that causes the implementation, by the processor PROC, of all or some of the methods described below by the processor PROC of all or some of the methods described hereafter in relation to FIGS. 5 to 8.

All or some of the methods described hereafter in relation to FIGS. 5 to 8 may be implemented in software form by execution of a set of instructions by a programmable machine, such as a DSP (Digital Signal Processor) or a processor such as the processor PROC, or be implemented in hardware form by a machine or dedicated component, such as an FPGA (Field-Programmable Gate Array), an ASIC (Application-Specific Integrated Circuit) or a network processor.

In general terms, the present invention concerns a method for optimising the electrical consumption of the residential gateway described above.

The method is characterised in that it comprises a step 1 during which at least one other pair of polarisation points PPEi is stored.

The method also comprises a step 2 during which a pair of polarisation points is selected from the pair of polarisation points PPD and said at least one pair of economical polarisation points PPEi according to the result of a comparative test on these pairs of polarisation points.

The method also comprises a step 3 during which the FXS port is configured from the pair of polarisation points thus selected.

Figure 5:
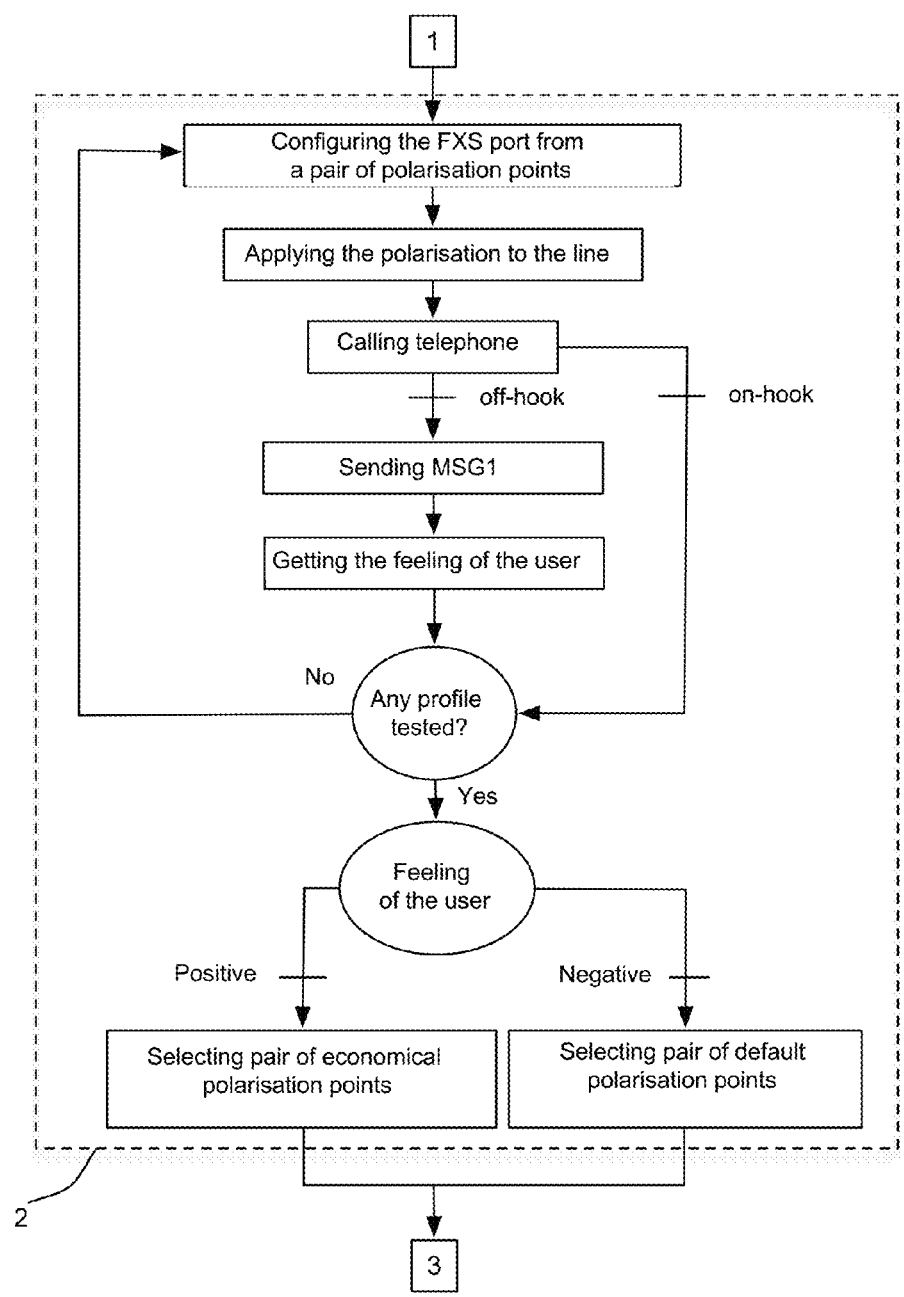
FIG. 5 shows a diagram of the steps of a first embodiment of the method for optimising the electrical consumption of a residential gateway.

FIG. 5 shows a diagram of the steps of a first embodiment of the method for optimising the electrical consumption of a residential gateway.

According to this embodiment, selecting a pair of polarisation points is performed thanks to the following steps. First of all, the FSX port is configured from a pair of economical polarisation points PPEi and an incoming call signal is then sent to the telephone via the line.

Two cases may then occur: either the line voltage and current characteristics enable the telephone to detect this signalling signal on the line and to emit a ringing signal, or these characteristics do not so enable.

If the telephone is not off-hooked by the user at the end of a predetermined period of time T1, i.e. in the case where the ringing signal is not sent or this ringing signal is sent but the user does not off-hook the telephone during this period of time T1, a negative feeling is attributed to this pair of polarisation points and another pair of economical polarisation points PPEi is considered.

In the case where the user off-hooks his telephone following the sending of the ringing signal and before the expiry of the period of time T1, a voice message MSG1 is then sent to this telephone. This message MSG1 is either stored in a memory, for example the ROM memory, or issues from a remote device then connected to the gateway.

At the end of the restitution of this message by the telephone, the user gives his feeling on the quality of the listening, a feeling that may be either positive, if he considers that this listening is overall satisfactory, or negative if he considers that this listening quality is not overall satisfactory.

The means GUI may, for example, be used for this purpose by presenting a form on a screen that is filled in by the user. The data on this form are then recorded in a memory either of the gateway or of remote item of equipment in association with the pair of polarisation points PPEi. These form data may further relate to a response set that allows knowing, for example, if the user has heard the ringing of the telephone and/or the message MSG1.

Each pair of polarisation points PPEi is thus processed so that, at the end of this processing, a feeling, either positive or negative, is attributed to each of these pairs of economical polarisation points.

In the case where the feeling of the user for a pair of polarisation points PPEi is positive, this pair of polarisation points PPEi is selected and, in the case where no feeling is positive, the pair of polarisation points PPD is selected.

In a variant of this embodiment relating to the case where several pairs of polarisation points PPEi have to be processed, the pairs of polarisation points are ordered so that they are processed from the most economical to the least economical and the pair of polarisation points is selected as soon as the feeling of the user is positive. The method then stops as soon as the feeling of the user is positive.

Figure 6:
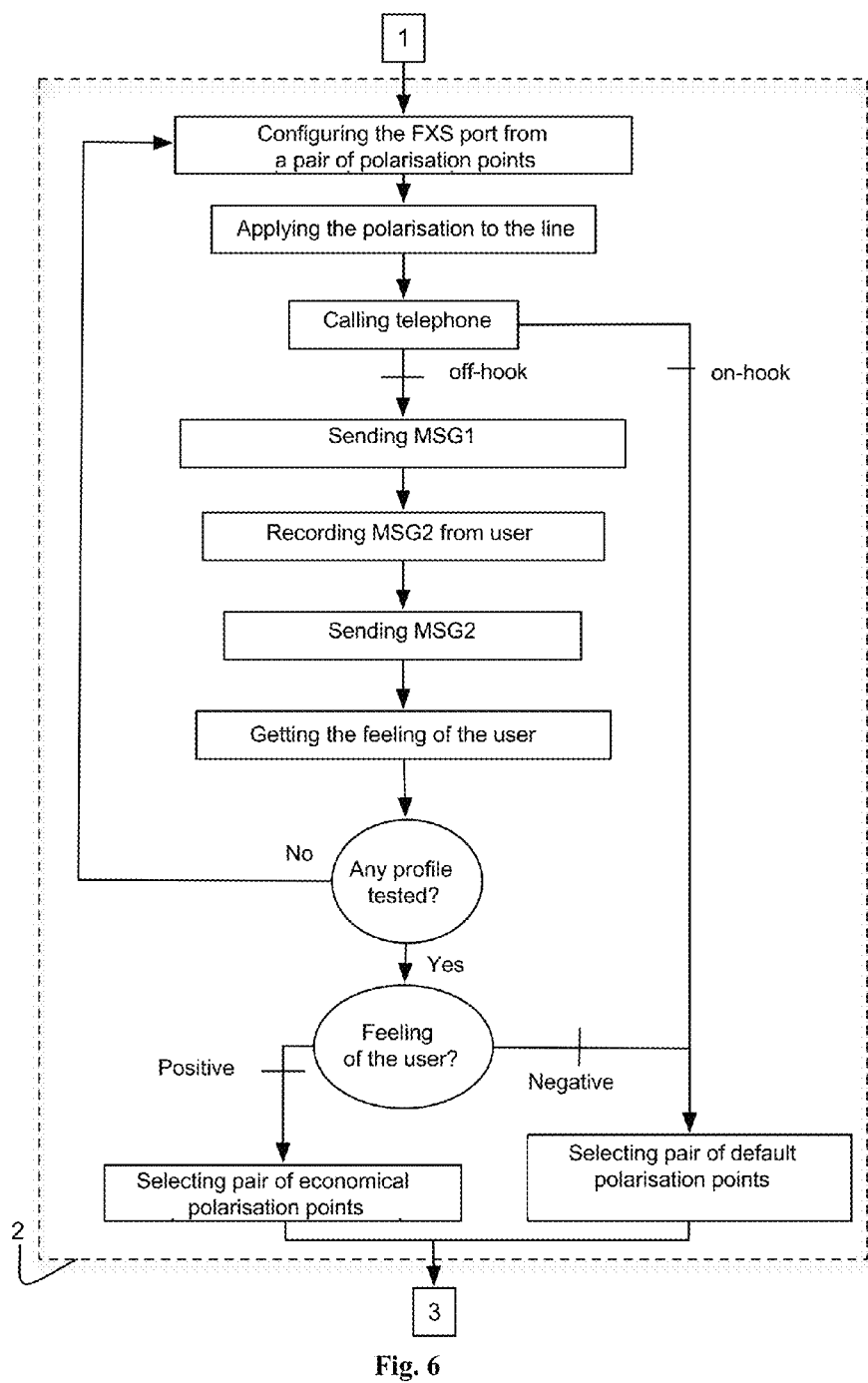
FIG. 6 shows variants of this first embodiment of the method for optimising the electrical consumption of a residential gateway.

FIG. 6 shows variants of this first embodiment.

According to one of these variants, once the user has off-hooked the handset of his telephone following the sending of the ringing signal, this user is invited to speak following the sending of a message MSG1 and a voice message MSG2 is thus sent by the telephone to the gateway. This message MSG2 is recorded in a memory of the gateway, for example the RAM memory, and then re-sent by the gateway to the telephone.

The feeling attributed to a pair of polarisation points PPEi is then determined from the feeling of the user resulting from the listening to MSG1 and MSG2.

Figure 7:
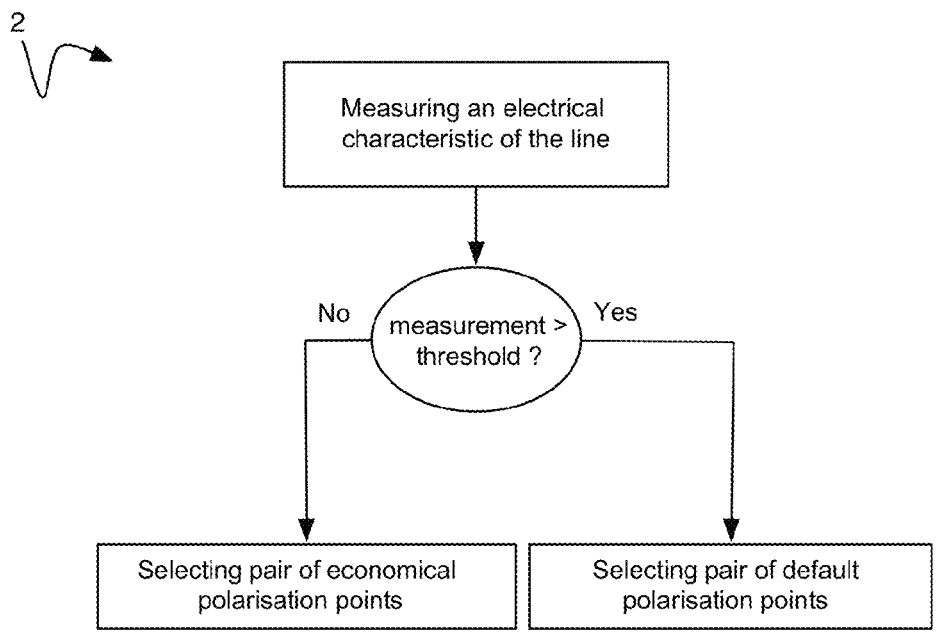
FIG. 7 shows a diagram of the steps of a second embodiment of the step of selecting a pair of polarisation points.

FIG. 7 shows a second embodiment of this method.

According to this embodiment, an electrical characteristic of the line then charged by the telephone is measured and, if this measurement is above a threshold, then the pair of polarisation points selected is the pair of polarisation points PPD, otherwise this pair is a pair of polarisation points PPEi.

According to one embodiment, the measurement of this electrical characteristic of the line is the current-carrying capacity of the line.

The current-carrying capacity of the line is usually quantified by an REN (Ringer Equivalent Number) or LN (Load Number) measurement. The REN is a concept introduced into the BELLCORE GR909 standard in order to characterise the electrical behaviour of a telephone compared with a telephone of the S63 type.

An REN greater than or equal to 1 represents the charging effect of a loop circuit of an old analogue telephone such as type S63 telephones.

If the REN measurement is greater than 1 then the pair of polarisation points selected is the pair of polarisation points PPD, otherwise this pair is a pair of polarisation points PPEi. It is then unnecessary to configure the FXS port from the pair of polarisation points PPEi since this telephone will compensate for the line voltage and current characteristics defined by the polarisation points and the quality of communication would be degraded. Moreover, if this REN is less than 1, the analogue telephone connected to the FXS port does not compensate for the long-line conditions and the configuration of the FXS port using the pair of polarisation points PPEI is then advantageous in terms of energy saving.

Two methods for calculating the current-carrying capacity of a line are known from the prior art.

One of these methods is measuring the line current during the sending of a ringing signal and the other is measuring the capacitor discharge time.

According to the first one of these methods, a ringing signal in the form of a pulse train is sent over the line. This ringing signal is defined so that the telephone remains mute despite the reception of this ringing signal.

This ringing signal, which may be stored in a memory of the gateway, is, for example, a 16 V alternating signal of frequency 20 Hz on a continuous component of 18 V.

When this ringing signal is sent, the line current is measured thanks to samples taken on the line. If the telephone handset is off-hooked by the user during the taking of these measurement samples, the measurement of the line current is cancelled. The taking of 50 samples at intervals of 10 ms suffices to estimate the alternating current consumed by the line by means of the processor PROC of the gateway. Next this value is compared with a table of prerecorded values issuing from measurements performed on known REN loads. The knowledge of four alternating current measurement points performed on standards of 0, 1, 3 and 5 REN suffices to estimate the load on the line. Indeed, since these values are stored in the non-volatile memory of the gateway, it is possible, by a quasi-linear approximation, to deduce the REN value of the line from the measurement of the alternating current previously performed.

Figure 8:
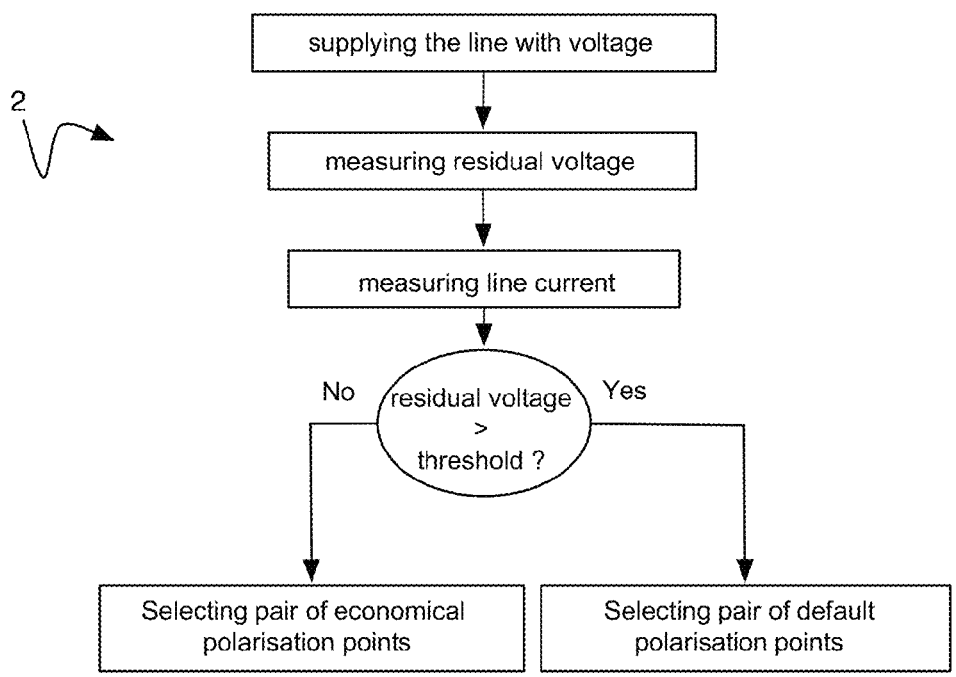
FIG. 8 illustrates a method for measuring the capacity of a line connecting a telephone to a residential gateway.

Another method, illustrated in FIG. 8, for calculating the current-carrying capacity of a line is to measure the discharge time of the capacitor that is in the telephone. This method enables detecting telephones that have high capacitances used in particular for self-supplying.

Its principle consists of supplying the line with DC voltage, for example 48 V, and then cutting off this supply and measuring the residual voltage on the line at the end of an interval of time. If this residual line voltage is above a threshold, for example 10 V, it is deduced from this that the telephone connected is a telephone that has high capacitance. In this case, the pair of polarisation points selected is the pair of default polarisation points PDD. In the contrary case, this pair is the pair of polarisation points PPEi.

This method can be applied in replacement for the REN measurement since the majority of telephones that have high capacitances also compensate for long-line conditions. However, it may also be used in addition to the REN measurement since there also exist telephones that have high capacitances without compensating for the long-line conditions.

According to one embodiment of the method, selecting the pair of polarisation points takes account of the feeling of the user (FIG. 5) and the measurement of the electrical characteristic of the line (FIG. 6).

For example, when the pair of polarisation points selected at the end of the second embodiment is a pair of economical polarisation points PPEi, a message, for example by email or via the GUI interface of the gateway, can then be sent to the user in order to cause him to initiate the first embodiment of the selecting step (FIG. 5) and the selected pair of polarisation points is the one that received a positive feeling.

According to one embodiment, selecting the pair of polarisation points is performed when the telephone is connected for the first time to the FXS port, and/or on starting up of the gateway and/or by remote triggering and/or cyclically.

According to one embodiment, selecting the pair of polarisation points is performed either by the gateway or by a remote operator following the reception by this operator of the measurement of an electrical characteristic of the line and/or the feeling of the user.

According to one embodiment, any one of the steps of the method may be pre-empted by the user.

According to one embodiment, the user may force the FXS port to be configured with a pair of economical polarisation points or with the pair of default polarisation points.

The invention claimed is:

1. A method for optimising the electrical consumption of a residential gateway comprising at least one Foreign Exchange Station (FXS) port to which an analogue telephone is connected via a line, said FXS port being configured from a pair of polarisation points, referred to as default, which defines maximum voltage and current characteristics of the line that are predetermined so as to ensure correct operation of the telephone in on-hook or off-hook mode whatever the type of this telephone, the method comprising:
   storing at least one other pair of polarisation points, referred to as economical, which defines maximum voltage and current characteristics of the line and which are lower than maximum voltage and current characteristics defined by the pair of default polarisation points,
   selecting a pair of polarisation points from amongst the pair of default polarisation points and said at least one pair of economical polarisation points depending on a result of a comparative test on all these pairs of polarisation points, and
   configuring the FXS port from the selected pair of polarisation points,
   wherein, when selecting a pair of polarisation points:
   the FXS port is configured from a pair of economical polarisation points,
   an incoming call signal is sent to the telephone via the line,
   in the case of off-hooking of the telephone by a user before the expiry of a predetermined period of time,
      a first voice message is sent to the telephone,
      a positive or negative feeling of the user is collected at the end of the listening to the first voice message
   if the telephone is not off-hooked by the user at the end of the predetermined time period of time, a negative feeling is attributed to this pair of polarisation points,
   these steps are reiterated for each pair of economical polarisation points,
   in the case of positive feeling of the user for a pair of economical polarisation points, this pair of economical polarisation points is selected,
   in the case where no feeling is positive, the pair of default polarisation points is selected.

2. The method according to claim 1, wherein, once the user has off-hooked the handset of his telephone following the sending of a ringing signal, the user is invited to speak at the end of the first voice message and a second voice message is sent by the telephone to the residential gateway, recorded during a given period of time and then re-sent to the telephone, the feeling attributed to a pair of polarisation points then being determined from the feeling of the user resulting from the listening to the first and second voice messages.

3. The method according to claim 1, wherein several pairs of polarisation points (PPEi) have to be processed, the pairs of polarisation points are then ordered so that to be processed from the most economical to the least economical and the pair of polarisation points is selected as soon as the feeling of the user is positive, the method then stopping as soon as the feeling of the user is positive.

4. The method according to claim 1, wherein a pair of polarisation points is selected by measuring an electrical characteristic of the line then charged by the telephone, and
   if this measurement is above a predetermined threshold, then the selected pair of polarisation points is the pair of default polarisation points, otherwise the selected pair of polarisation points is the pair of economical polarisation points.

5. The method according to claim 4, wherein the measured electrical characteristic of the line is the current-carrying capacity of the line.

6. The method according to claim 4, wherein selecting the pair of polarisation points takes account of the feeling of the user and the measurement of the electrical characteristic of the line.

7. The method according to claim 1, wherein selecting the pair of polarisation points is performed when the telephone is connected for the first time to the FXS port, and/or on starting up of the residential gateway, and/or by remote triggering, and/or cyclically.

8. The method according to claim 1, wherein selecting the pair of polarisation points is performed either by the residential gateway or by a remote operator following the reception by said operator of the measurement of the electrical characteristic of the line and/or of the feeling of the user.

9. The method according to claim 1, wherein any one of the steps is pre-empted by the user.

10. The method according to claim 1, wherein the user may force the FXS port to be configured with a pair of economical polarisation points or with the pair of default polarisation points.

11. Non-transitory computer readable medium storing a computer program comprising instructions for implementing, by a residential gateway when said program is executed by a processor of the residential gateway, a method for optimising the electrical consumption of the residential gateway comprising at least one Foreign Exchange Station (FXS) port to which an analogue telephone is connected via a line, said FXS port being configured from a pair of polarisation points, referred to as default, which defines maximum voltage and current characteristics of the line that are predetermined so as to ensure correct operation of the telephone in on-hook or off-hook mode whatever the type of this telephone, the method comprising:
   storing at least one other pair of polarisation points, referred to as economical, which defines maximum voltage and current characteristics of the line and which are lower than maximum voltage and current characteristics defined by the pair of default polarisation points,
   selecting a pair of polarisation points from amongst the pair of default polarisation points and said at least one pair of economical polarisation points depending on the result of a comparative test on all these pairs of polarisation points, and
   configuring the FXS port from the selected pair of polarisation points, wherein, when selecting a pair of polarisation points:
the FXS port is configured from a pair of economical polarisation points,
an incoming call signal is sent to the telephone via the line,
in the case of off-hooking of the telephone by a user before the expiry of a predetermined period of time,
a first voice message is sent to the telephone,
a positive or negative feeling of the user is collected at the end of the listening to the first voice message
if the telephone is not off-hooked by the user at the end of the predetermined time period of time, a negative feeling is attributed to this pair of polarisation points,
these steps are reiterated for each pair of economical polarisation points,
in the case of positive feeling of the user for a pair of economical polarisation points, this pair of economical polarisation points is selected,
in the case where no feeling is positive, the pair of default polarisation points is selected.

12. Residential gateway comprising at least one Foreign Exchange Station (FXS) port intended to connect an analogue telephone via a line, the residential gateway being configured for:
configuring an FXS port from a pair of polarisation points referred to as default, which defines maximum voltage and current characteristics of the line that are predetermined so as to ensure correct operation of the telephone in on-hook or off-hook mode whatever the type of this telephone,
obtaining at least one other pair of polarisation points, referred to as economical, which defines maximum voltage and current characteristics of the line and which are lower than maximum voltage and current characteristics defined by the pair of default polarisation points,
selecting a pair of polarisation points from amongst the pair of default polarisation points and said at least one pair of economical polarisation points according to a result of a comparative test on all these pairs of polarisation points, and
configuring the FXS port from the selected pair of polarisation points,
wherein selecting a pair of polarisation points comprises:
configuring the FXS port from a pair of economical polarisation points,
sending an incoming call signal to the telephone via the line,
in the event of the telephone being off-hooked by a user before the expiry of a predetermined period of time, sending a voice message to the telephone, and
collecting a positive or negative feeling of the user at the end of the listening to the voice message,
in the case of the telephone not being off-hooked by a user at the end of the predetermined period of time, a negative feeling is attributed to this pair of polarisation points,
reiterating these steps for each pair of economical polarisation points,
in the event of a positive feeling by the user for a pair of economical polarisation points, this pair of economical polarisation points is selected, and
in the case where no feeling is positive, the pair of default polarisation points is selected.

* * * * *